United States Patent
Calais

(10) Patent No.: US 10,989,387 B2
(45) Date of Patent: Apr. 27, 2021

(54) AUTOMOTIVE LIGHT DEVICE WITH HOMOGENEOUS EMITTING SURFACE

(71) Applicant: Valeo North America, Inc., Troy, MI (US)

(72) Inventor: Valere Calais, Orsay (FR)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/929,075

(22) Filed: Dec. 21, 2018

(65) Prior Publication Data
US 2020/0200355 A1 Jun. 25, 2020

(51) Int. Cl.
F21S 43/16 (2018.01)
F21V 7/04 (2006.01)
F21V 3/08 (2018.01)

(52) U.S. Cl.
CPC .............. *F21S 43/16* (2018.01); *F21V 3/08* (2018.02); *F21V 7/04* (2013.01)

(58) Field of Classification Search
CPC ........ F21S 43/16; H01L 51/502; F21V 13/08; F21V 9/30–45; F21V 3/08
See application file for complete search history.

(56) References Cited

U.S. PATENT DOCUMENTS

| | | | |
|---|---|---|---|
| 8,434,924 B1 * | 5/2013 | Hamburgen | G02B 6/0068 362/612 |
| 2002/0018632 A1 | 2/2002 | Pelka | |
| 2005/0265404 A1 | 12/2005 | Ashdown | |
| 2006/0103589 A1 | 5/2006 | Chua et al. | |
| 2007/0001161 A1 * | 1/2007 | Murakowski | G02B 6/10 257/14 |
| 2009/0129115 A1 | 5/2009 | Fine et al. | |
| 2009/0141476 A1 * | 6/2009 | Meir | G02B 6/005 362/84 |
| 2010/0002414 A1 * | 1/2010 | Meir | G02B 6/0023 362/84 |
| 2012/0248479 A1 | 10/2012 | Anc | |
| 2013/0063964 A1 * | 3/2013 | Meir | G02B 6/005 362/555 |
| 2013/0200360 A1 * | 8/2013 | Oikawa | H01L 51/0085 257/40 |
| 2013/0264590 A1 * | 10/2013 | Oh | G02B 6/0041 257/88 |
| 2014/0027712 A1 | 1/2014 | Breen | |
| 2018/0079354 A1 | 3/2018 | Dellock | |
| 2018/0203176 A1 | 7/2018 | Schmidt | |

OTHER PUBLICATIONS

International Searching Authority of the Patent Cooperation Treaty, International Search Report and Written Opinion of corresponding international Application No. PCT/US2019/067995, dated Jun. 25, 2020.

* cited by examiner

*Primary Examiner* — Anabel Ton
(74) *Attorney, Agent, or Firm* — Valeo North America, Inc.

(57) ABSTRACT

A light device for a vehicle includes an enclosure having a transmissive portion configured to transmit light generated within the enclosure. A matrix material is contained within the enclosure and includes quantum dots dispersed throughout the matrix material. An energy source is configured to couple energy to the quantum dots such that the quantum dots emit light that is transmitted through the transmissive portion of the enclosure.

12 Claims, 4 Drawing Sheets

AUTOMOTIVE LIGHT DEVICE WITH HOMOGENEOUS EMITTING SURFACE

FIELD OF THE INVENTION

This invention relates to lighting systems, and more particularly to a lighting and/or signaling device that utilizes a quantum dot light emitting surface.

BACKGROUND OF THE INVENTION

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

It is difficult to provide aesthetically appealing vehicle lighting devices that meet the required technical specifications. For example, taillights on existing cars tend to be power hungry and need various components, such as reflectors. Head lamps are similar in that they require multiple components, such as reflectors, cut off devices and the like. Aesthetic lighting effects lead to an even greater number of components and complexity. Such vehicle lighting devices are not easily adapted to the styling of the vehicle.

In recent years some vehicle manufacturers are utilizing organic light-emitting diodes (OLED) in an effort to meet desired lighting and aesthetic characteristics of vehicle lighting. OLED devices generally take the form of very thin panels that can be formed into three-dimensional shapes. However, OLED technology has not been widely implemented in automotive lighting.

SUMMARY OF THE INVENTION

It is one object of the invention to provide a quantum dot light panel device that can meet the technical and aesthetic requirements for vehicle lighting.

Another object of the invention is to provide a light panel device that can conform to the styling of a vehicle.

Yet another object of the invention is to provide a vehicle light panel having a plurality of light sources.

Still another aspect of the invention is to provide a light panel having spatial lighting effects.

These and/or other objects may be provided by aspects of the invention disclosed herein.

Aspect (1) includes a light device for a vehicle includes an enclosure having a transmissive portion configured to transmit light generated within the enclosure, a matrix material contained within the enclosure and including quantum dots dispersed throughout the matrix material. An energy source is configured to couple energy to the quantum dots such that the quantum dots emit light that is transmitted through the transmissive portion of the enclosure.

Aspect (2) includes the light device of Aspect (1), wherein the enclosure further including at least one of a reflective portion and an opaque portion which is positioned opposite to the transmissive portion with the fluid material contained therebetween.

Aspect (3) includes the light device of claim 1), wherein the enclosure is a rigid structure.

Aspect (4) includes the light device of Aspect (1), wherein the enclosure is a pliable structure.

Aspect (5) includes the light device of Aspect (1), wherein the matrix material is a liquid with the quantum dots dispersed in the liquid.

Aspect (6) includes the device of Aspect (1), wherein the matrix material is a cured liquid with the quantum dots suspended therein.

Aspect (7) includes the device of Aspect (1), wherein the quantum dots include multiple quantum dots having different sizes such that the quantum dots emit light having different wavelengths.

Aspect (8) includes the device of Aspect (7), wherein the quantum dots are homogeneously dispersed in the matrix such that the multiple wavelengths combine to form white light.

Aspect (9) includes the device of Aspect (1), wherein the an energy source includes a light source optically coupled to the matrix and configured to provide pumping light at a wavelength spectrum that includes an absorption wavelength that can be absorbed by the quantum dots.

Aspect (10) includes the device of Aspect (9), wherein the light source includes a first light source and a second light source each optically coupled to the matrix and configured to provide pumping light at a wavelength spectrum that includes an absorption wavelength that can be absorbed by the quantum dots.

Aspect (11) includes the lighting device of Aspect (10), wherein the first and second light sources are configured to generate first and second light of a same type.

Aspect (12) includes the lighting device of Aspect (2), wherein the first and second light sources are configured to generate first and second light of different types.

Aspect (13) includes the lighting device of Aspect (1), wherein the energy source is an electrical energy source electrically coupled to the matrix material containing the quantum dots.

Aspect (14) includes the lighting device of Aspect (1), further including: a first electrode provided at a first position inside the container, and a second electrode provided at a second position opposite to the first position such that a voltage potential provided between the first and second electrodes couples current energy to the quantum dots to emit light.

Aspect (15) includes the lighting device of Aspect (10), further including a controller configured to control the first and second light sources to achieve different light output characteristics from the panel.

Aspect (16) includes the lighting device of Aspect (15), wherein the controller is configured to control the first and second light sources to achieve at least one of spatial effects and dynamic effects of light output in the illumination region.

DETAILED DESCRIPTION OF SEVERAL EMBODIMENTS

Figure 1:
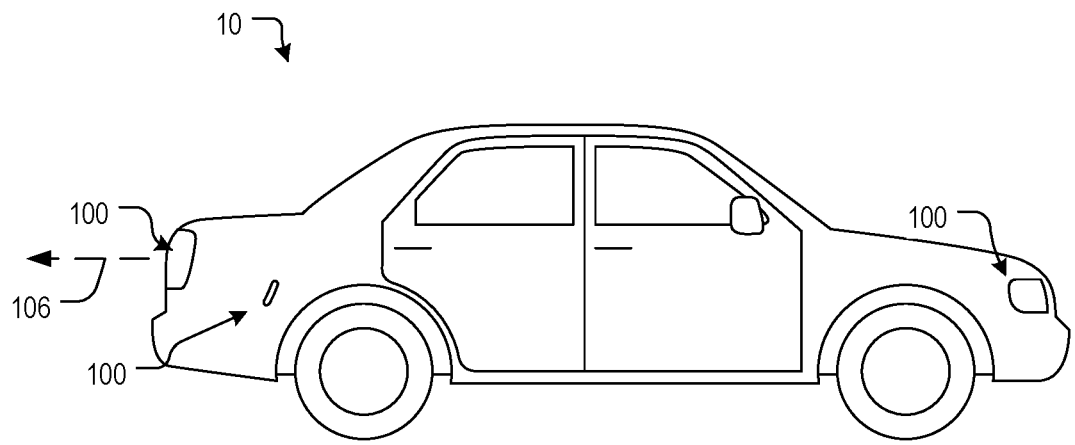
FIG. 1 illustrates an automotive vehicle with a rear lighting device in accordance with embodiments of the disclosure.

With reference to FIG. 1, the present disclosure is generally related to automotive lighting. More specifically, FIG. 1 illustrates an automotive vehicle 10 with a lighting devices 100 such as rear lighting device 100 having light output 106. It can be appreciated that the lighting device 100 is merely representative and can be one of a variety of lighting devices of the automotive vehicle including, but not limited to, dipped-beam lamps, main-beam lamps, front fog lamps, cornering lamps, daytime running lamps, parking lamps, direction indicators, tail lamps, and stop lamps. In an embodiment, the lighting device 100 can be mounted to the automotive vehicle 10 either vertically or horizontally, and other shapes of the lighting device 100 may be used as appropriate. In an example, the rear lighting device 100 is a traditional automotive lamp.

As discussed in the Background section above, OLED technology has not been widely implemented in automotive lighting. The present inventor has recognized that this is due to issues of reliability, decreased performance over time, water sensitivity and high tooling costs for manufacturing. Based on this recognition, the present inventor discovered that quantum dot vehicle lighting devices can provide many of the same properties and advantages as OLED technology.

In one embodiment of the disclosure, a vehicle lighting device uses quantum dots (QD) in suspension in water, organic solvent, or other suitable liquid. The liquid is trapped inside a cavity having at least one transparent wall. Light is emitted by the device through the at least one transparent wall, which can be planar, convex, or any other complex form that may be used to keep the QD solution inside the cavity without leaking. The device may use an optical energy source or an electrical energy source to cause light emission from the device. For example, the device may use a primary light source to emit pumping light to the QD solution. The QDs may be selected such that they convert the wavelength of the primary source into a new wavelength such that the QD solution is the secondary source. As another example, the QD solution may be provided between electrodes which apply a current to make the QD emit light. At least one of the electrodes is transparent to the QD emitted light such that the light is emitted from the device. Selection of appropriate sized QDs may provide a cascade effect to obtain an efficiency near 100%.

In another embodiment, the QDs are mixed in a solution that is placed within the cavity, and which becomes more viscous or solid with time, light action or catalyst. This forms a material that avoids agglomeration of the QDs and improves the behavior of the device (homogeneity, thermal, lifetime). This provides more flexibility during manufacturing, higher luminescence, better reliability, reduces sensitive to water, permits nearly any possible shape, and minimizes deviation of performances over time.

Figure 2:
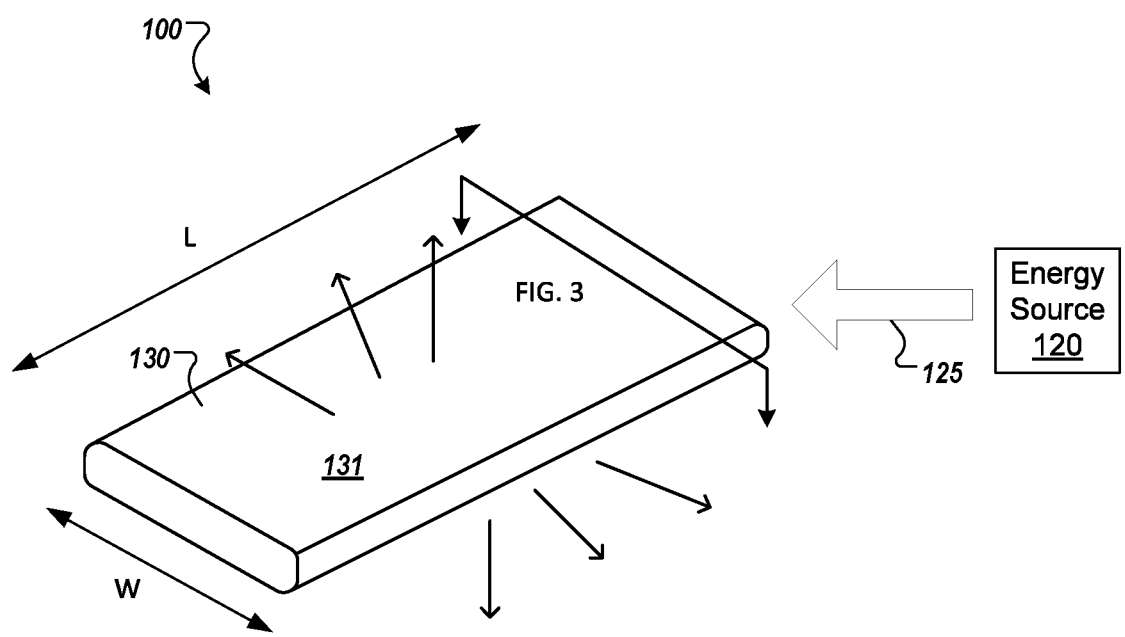
FIG. 2 is a planar view of a quantum dot light panel used in a lighting device according to embodiments of the disclosure.

FIG. 2 is a schematic representation of a vehicle light device in accordance with an embodiment of the invention. The light device 100 includes energy source 120 and a quantum dot light panel 130. The energy source 120 supplies energy 125 to the panel 130 to cause the panel to emit light from a surface of the device to meet the desired vehicle lighting function. According to embodiments of the invention, the panel 130 includes a plurality of quantum dots which emit light that is output from an illumination region 131 of the panel such that the light can perform one or more vehicle light functions. As seen, the panel 130 includes a length L and a width W which define a generally planar and generally rectangular panel 130 and generally rectangular illumination region 131. The panel 130 and illumination region 131 may assume other arrangements and forms and are not limited to rectangularity. For example, the panel 131 may have a width W that generally exceeds a length L. In example embodiments, the panel 131 is pliable and flexible. In other embodiments, the panel 131 is a rigid structure formed in a predetermined shape.

Figure 3:
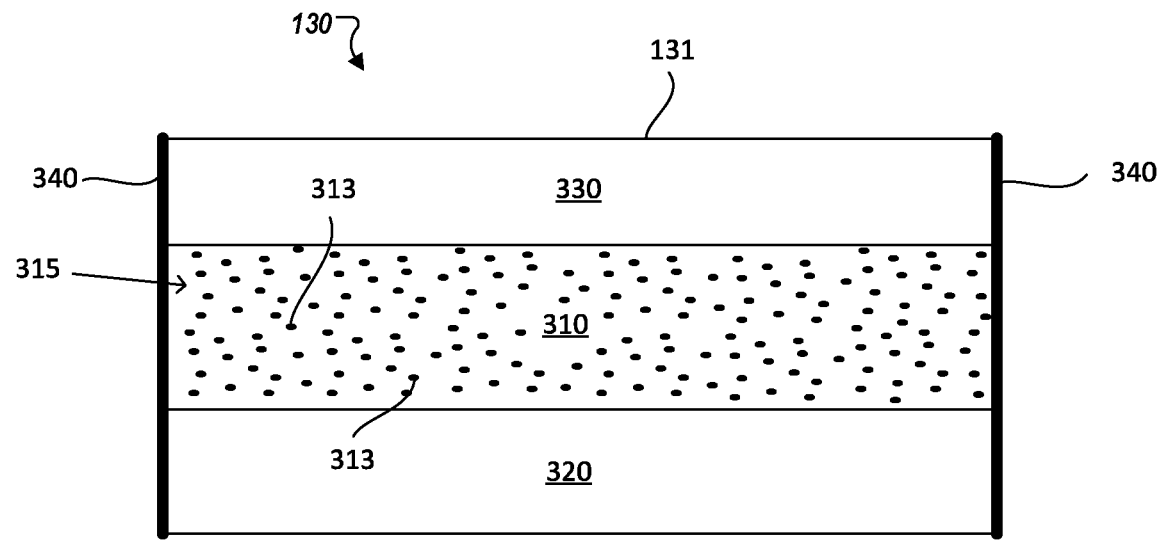
FIG. 3 is a cross-sectional view of the QD light panel of FIG. 2.

FIG. 3 provides a schematic view of a cross-section of vehicle light panel of FIG. 2 according to example embodiments of the present disclosure. As seen, the panel 130 includes a quantum dot portion 310, a base portion 320, and a transmission portion 330. Optional reflective end portions 340 may also be used to provide feedback and/or confine light output to a desired region. The QD portion 310 includes a plurality of QDs 313 dispersed in a surrounding material 315. The base portion 320 may be at least one of a reflective portion and an opaque portion which is positioned opposite to said transmissive portion with said fluid material contained therebetween. The base portion 320 may reflect light output from a backside of the QD portion 310 to facilitate light output from a single side of the panel 130 in illumination region 131. The light transmission portion 330 may be provided at the light emitting side of the panel to achieve various optical effects to light output from the QDs 313. While shown as a planar structure in layers in FIGS. 2 and 3, portions 310, 320 and 330 may be other non-planar forms. Further, the terms "portion" and "layer" are used interchangeably herein and encompass single and multilayer structures, as well as integral structures having added materials and/or optical structures formed thereon.

As is known in the art, the quantum dots 313 emit light at a particular wavelength in response to input energy from the energy source 120. The base layer 320 has a top and a bottom surface, as well as edges. The bottom surface of the base layer 320 forms the bottom of the light device 130. The protective layer 330 also has a top and a bottom surface, as well as edges. The top surface of the protective layer forms the top surface and light emitting region 131 of the light device 130. In the embodiment shown, the protective layer 330, and the base layer 320 are both transmissive to light of the emission wavelength of the quantum dots 313. The base layer 320 and the protective layer 330 may be rigid, but are preferably formed of thin, flexible film so that the light panel 130 can readily be applied to a curved or irregular surface or bent into a desired shape. The base layer 320 and the protective layer 330 may comprise, for example, a polymeric material such as plastic or silicone. The base layer 320 is sufficiently thick to support the layer of quantum dots 310 when the protective layer 320 is in place.

The layer of quantum dots 310 comprises individual quantum dots 313 dispersed within a surrounding material 315. The quantum dots 313 may be uniformly distributed throughout the material 315 across the layer 310 so as to absorb pump radiation incident thereon and provide homogenous light output, for example. The quantum dots 313 themselves are preferably between about 2 to 10 nanometers (nm) in size. In the preferred embodiment, the structure 130, which includes the base layer 320, the layer of quantum dots 310, and the protective layer 330, is preferably about 500 to 1000 micrometers (μm) thick. The length and width of the light device 130, however, is significantly larger; for example, the length or width may be about ½ inch (in.) to ten or more inches or several feet (ft.).

Quantum dots such as in the layer of quantum dots 313 are well known in the art and are available from numerous sources. These quantum dots 313 may comprise various materials including semiconductors such as zinc selenide (ZnSe), cadmium selenide (CdSe), cadmium sulfide (CdS), indium arsenide (InAs), indium phosphide (InP) and/or titanium dioxide (TiO2). The size of the QDs 313 may range from about 2 to 10 nm. As is known, since the size of these QDs 313 is so small, quantum physics governs many of the electrical and optical properties of the quantum dot 313. One such result of the application of quantum mechanics to the QD 313 is that QDs absorb a broad spectrum of optical wavelengths and re-emit radiation having a wavelength that is longer than the wavelength of the absorbed light. The wavelength of the emitted light is governed by the material composition and size of the quantum dot 313. For example, CdSe quantum dots 5.0 nm in diameter emit radiation having a narrow spectral distribution centered about 625 nm while quantum dots 313 comprising CdSe 2.2 nm in size emit light having a center wavelength of about 500 nm. Semiconductor quantum dots comprising CdSe, InP, and InAs, can emit radiation having center wavelengths in the range between 400 nm to about 1.5 μm; titanium dioxide TiO2 also emits in this range.

It should be understood that the panel 130 may include any number of QDs 313 depending on the environment in which they are going to be used. In some of the embodiments, there are on the order of thousands to millions of QDs of similar size to emit a narrowband wavelength. Obviously, these are just illustrations and other numbers and sizes of QDs could be used. Also, the plurality of QDs 313 may have different sizes or dimensions, such as different diameters. In the example of FIG. 3, the QDs 313 are randomly dispersed in the QD solution 315. However, the QDs may be dispersed non-uniformly and/or non-randomly to achieve a desired light output from the device 130. Thus, the plurality of QDs 313 can be different shapes, dimensions and sizes and are adapted and arranged in the predetermined form depending on the light pattern or lighting function desired.

The linewidth of the emission, i.e., full-width half-maximum (FWHM), for these semiconductor materials may range from about 20 to 30 nm. To produce this narrowband emission, quantum dots 313 simply need to absorb light having wavelengths shorter than the wavelength of the light emitted by the dots. For example, for 5.0 nm diameter CdSe quantum dots light having wavelengths shorter than about 625 nm is absorbed to produce emission at about 625 nm while for 2.2 nm quantum dots comprising CdSe light having wavelengths smaller than about 500 nm is absorbed and re-emitted at about 500 nm. In practice, however, the excitation or pump radiation is at least about 50 nanometers shorter than the emitted radiation.

Figure 4:
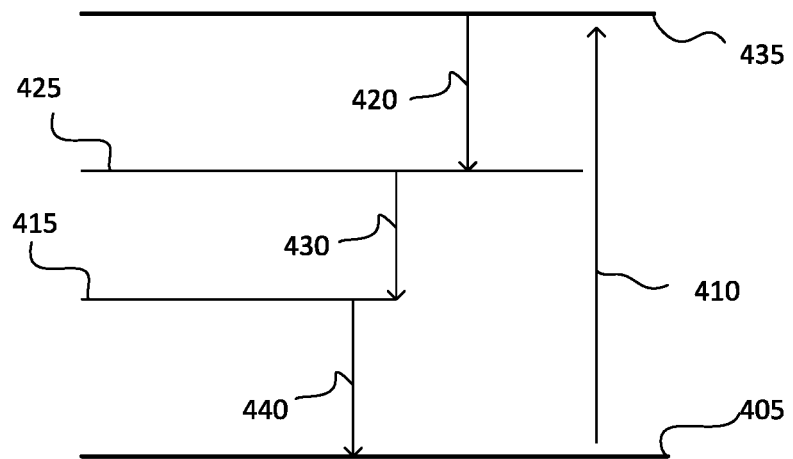
FIG. 4 is an energy diagram showing wave length conversion of a QD device according to an example embodiment of the disclosure.

FIG. 4 is an energy diagram showing wave length conversion of a QD device according to an example embodiment of the disclosure. In FIG. 4, arrow 410 represents the energy of optical pumping or electrical excitation from low energy band 405 to high energy band 435. Photons at the highest energy level 435 may lose energy to a QD of a first size to emit light at a wavelength of λ1 as shown by arrow 420. The resulting energy level 425 has an energy level of about ⅔ of the highest energy level 435. Photons at this energy level 425 may lose energy to a QD of a second size to emit light at a wavelength of λ2 as shown by arrow 430, which is at an energy level of about ⅓ of the highest energy level 435. Finally, photons at the level 415 may lose further energy to a QD of a third size to emit light at λ3 as shown by arrow 440, which is reduced to the lowest energy level 405 again. This energy diagram shows high efficiency conversion with QDs.

Figure 5A:
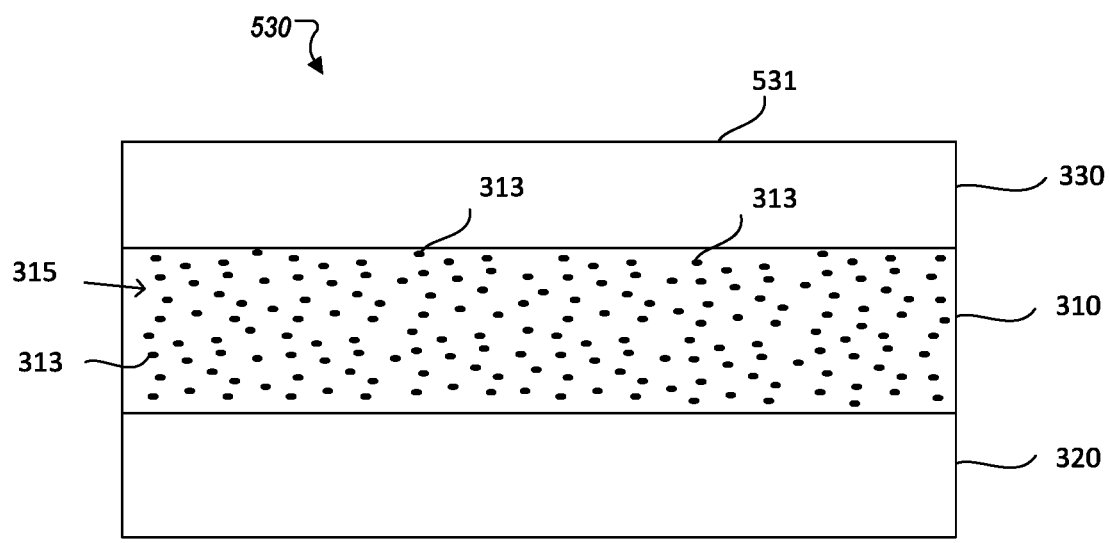
FIG. 5A is a cross-sectional view of a QD light panel using a light source as an energy source according to the embodiments of the disclosure.

In one embodiment, the energy source 120 of FIG. 1 can be a light source. FIG. 5A is a cross-sectional view of a QD light panel using a light source as an energy source according to embodiments of the disclosure. The light source 550 may any suitable source for generating light having radiation and/or photometric characteristics to provide a desired light output from panel 530. For example, the light sources may provide a lambertian pattern or any other radiation pattern of suitable flux, wavelength and intensity to satisfy the lighting function or aesthetic lighting effects of the panel 530. The light source 550 may include one or more light emitting devices or solid state light sources. The term "solid state" generally refers to light emitted by solid-state electroluminescence, as opposed to incandescent bulbs or fluorescent tubes. For example, the light source 550 may include a semiconductor light emitting diode (LED) or laser diode, an OLED, polymer light emitting diode (PLED), an LED lamp package, LED chip or LED die, or an array of one or more of these devices. Where a plurality of LEDs is used, they can be the same or different colors. It should be understood that the light source 550 could be multiple discrete LEDs or an LED light bar. A conventional printed circuit board (PCB) having one or more LEDs could be used with the panel 530. In one example, the light source may be an LED providing a 2 W, 140 lm output at 2.65 v. and 750 mA of current. Alternatively, 860 mA, 6.29 V, 510 lm white 1×2 LED source may be provided as light source 20. Halogen bulbs and/or an HID source may also be used.

According to embodiments, properties of the QD layer 310, base layer 320, transmission layer 330 and/or light source 550 can be altered to provide desired light output characteristics from the panel 530. For example, light source 550 may be two separate light sources 550a and 550b which provide the same type of light energy. As used herein "same type of light" means light intended to have identical characteristics despite manufacturing variations of the light sources and/or optical components associated therewith. This configuration increases brightness of light output from panel 130 when sources 550a and 550b simultaneously provide first and second light to the panel 530.

Further, control of the state of different light sources can achieve different lighting functions from the QD panel. Where same type light sources are used, switching between a single source and both sources provides different brightness outputs from the panel at different times. For example, either light source 550a and 550b alone can provide light energy to panel 530 to cause emission of red light to satisfy a lower brightness tail light function in a vehicle, while both sources can simultaneously couple higher intensity light to the panel 530 to satisfy a higher brightness brake light function. Multiple light sources can also be controlled to balance use of the sources over the life of the lighting device.

Light sources 550a and 550b may also provide different types of light to the panel 530. For example, one source may cause emission of red light for a tail light or brake light function, while the other source causes emission of white light for a reverse light function. If desired, the different type sources can be simultaneously activated to provide color mixing for additional functionality such as aesthetic effects of the vehicle lighting. Switching of light sources may be controlled by a user activated manual switch and/or by a processor or controller such as those described in FIG. 6 herein.

Spatial variation in the QD layer 310 may be achieved by varying properties of the material 315 or the QDs 313. For example, material 315 may include additives such as color filters, phosphorus, or other additives to achieve spatial effect. Spacing or pitch of the QDs may be used to change light output characteristics across the illumination region 131.

Any of the above spatial effects based on the design of the panel 530 can be achieved by a single light source coupled to the panel 530, or may be combined with a panel using plural light sources to provide versatile functionality and spatial effects to panel 530. Variation in a physical property of the panel can be achieved by an integral layer having continuously varying property, and/or by combination of discrete portions to achieve a varying effect. For example, the base layer 320 may be made of several discrete sheets having different properties and joined side-by-side to provide a base layer for a single panel 530. Thus, the term panel refers to a generally continual surface rather than an integral layer or sheet of material.

In some embodiments, the QDs can be provided in different planes. For example, a first group of QDs can be positioned in a first plane P1, and a second group of QDs can be positioned in a second plane P2. These first and second planes P1 and P2 may be encapsulated in material 315 as an integral structure, or provided in separate light sub-panels joined with adhesive. Different panels may be used as sub-panels which are stacked to achieve a desired effect.

Control of the light sources includes controlling an on/off state of the light source, as well as control of a driver circuit to achieve continuous variation of light output characteristics from the panel. For example, PWM control of an LED driver circuit can achieve continuous adjustment from low beam to high beam output of a headlight assembly. Similarly, control of current of a driver can provide color adjustment for light sources having a pumping wavelength output that is dependent on current. Any control techniques of the light sources or light panel output may be achieved by use of a software controlled processor such as that described in the vehicle environment of FIG. 6 below.

In some embodiments, timing control of light sources 550a, 550b can be combined with spatial effects of the panel to achieve dynamic lighting effects in the illumination region 131. For example, separate light sources (as opposed to common light source shown in FIG. 3) permits dynamic effects. A printed circuit board (PCB) may provide electronics and/or optics for switching the light sources according to predetermined timing, which may be stored in a memory. The PCB may include one or more of the memory, processors, controllers or interfaces discussed in the vehicle environment of FIG. 6 to achieve versatile functionality, spatial effects and/or dynamic effects.

As another example, light panels can be used for interior lighting, and dynamic control can provide versatile aesthetic effects. Lighting control algorithms may be provided by software "apps" that can be loaded into the vehicle environment of FIG. 6 to change the look of the interior lighting to suite a particular user.

Figure 5B:
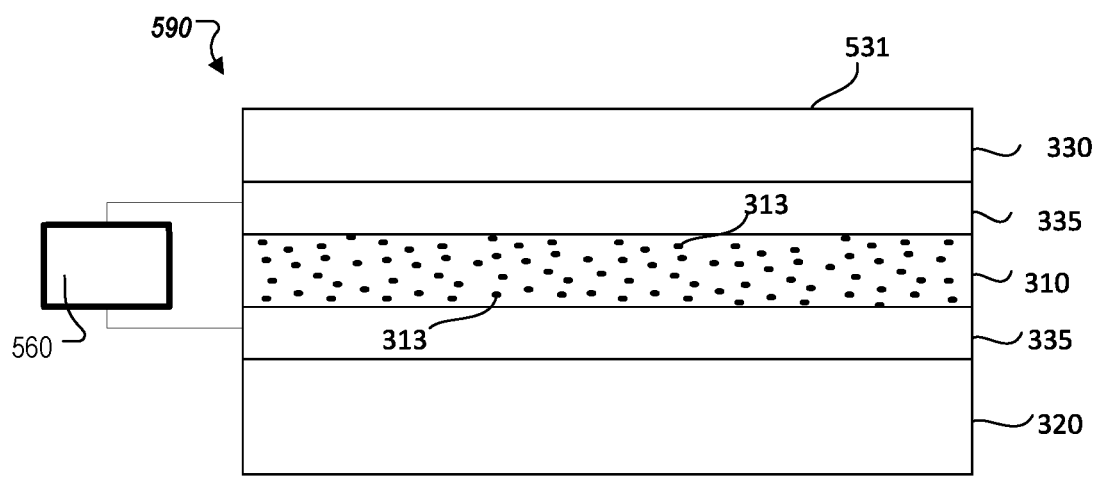
FIG. 5B is a cross-sectional view of a QD light-panel using an electrical source as an energy source according to the embodiments of the disclosure.

FIG. 5B is a cross-sectional view of a QD light-panel using an electrical source as an energy source according to the embodiments of the disclosure. As seen the device 590 includes electrodes 335 provided on opposing sides of the QD panel layer 310. The electrode at the illuminating side 531 is at least partially transmissive to light generated by the QDs 313. The remaining electrode may be transmissive or reflective depending on the application. In the embodiment of FIG. 5B, the energy source is a voltage source 560 which provides a potential difference between the electrodes causing a current to flow through the QD layer 310, which provides energy to cause photon emission of the QDs 313. Voltage of the source 560, and/or properties of the device 590 can be varied to affect different energy delivery to the QDs to achieve a desired light output. That is, the material composition, conductivity, resistivity and or other electrical properties of the layers 310, 320 330 and 335 may be varied to achieve a desired result. Further, material composition and size of the QDs may be varied to achieve desired light output as discussed above with respect to FIG. 5B.

Figure 6:
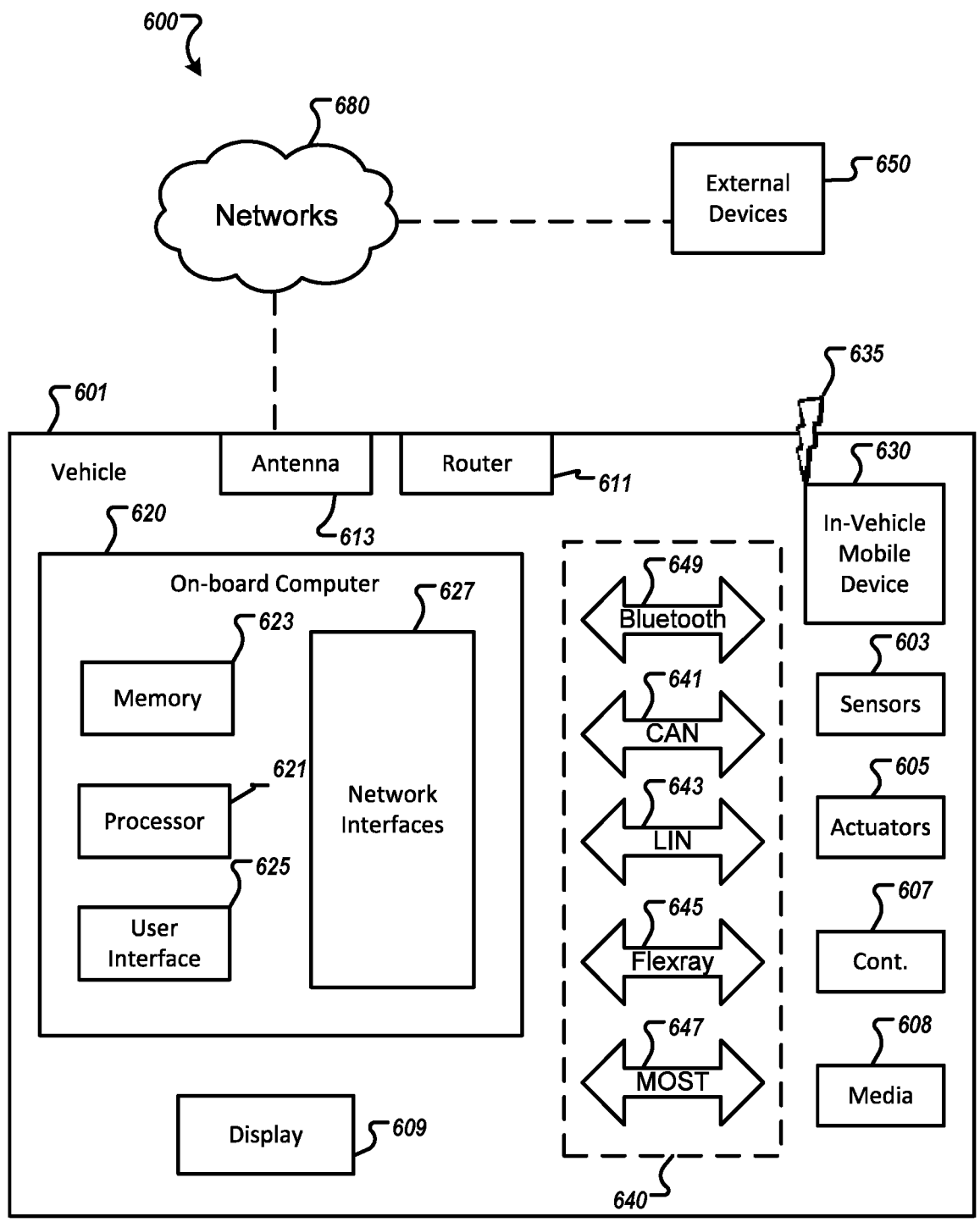
FIG. 6 is a simplified block diagram of a vehicle environment in which embodiments of the invention disclosed herein may be implemented.

FIG. 6 is a simplified block diagram of a vehicle environment in which embodiments of the invention disclosed herein may be implemented. The vehicle environment 600 includes a vehicle 601 in communication with one or more external devices 650 by way of one or more external networks 680. Vehicle 601 also includes various internal networks 640 for interconnecting several vehicle devices within the vehicle as will be discussed below. The vehicle environment 600 may also include one or more in-vehicle mobile device 630. External devices 650 include any device located outside the vehicle 601 such that the external device must communicate with the vehicle and its devices by an external network 680. For example, the external devices may include mobile devices, electronic devices in networked systems (e.g., servers or clients in a local area network (LAN), etc.), on board computers of other vehicles etc. In-vehicle mobile devices 630 are devices which are located within, or in the vicinity of the vehicle 601 such that the in-vehicle mobile device can communicate directly with internal networks 640 of the vehicle 601. In-vehicle mobile devices 630 may also connect with external networks 680 as discussed below.

Vehicle 601 includes vehicle devices integral with or otherwise associated with the vehicle 601. In the embodiment of FIG. 6, vehicle devices include one or more sensors 603, one or more actuators 605, one or more control units 607, one or more media systems 608, one or more displays 609, one or more routers 611, one or more antenna 613, and one or more on board computers 620. As used herein, the term "vehicle device" is meant to encompass sensors, actuators, controllers, electronic control units (ECUs), detectors, instruments, embedded devices, media devices including speakers, a CD and/or DVD player, a radio, etc., vehicle navigation systems (e.g., GPS) displays, other peripheral or auxiliary devices or components associated with the vehicle 601.

Sensors 603 detect various conditions within (or in the immediate vicinity of) the vehicle 601. For example, sensors 603 may be temperature sensors, photosensors, position sensors, speed sensors, angle sensors or any other sensor for detecting a diagnostic condition or other parameter of the vehicle 601 or its ambient environment. Sensors 603 may be passive or "dumb" sensors that provide an analog representative of the sensed parameter, or so called "smart" sensors with integrated memory and digital processing capability to analyze the parameter sensed within the sensor itself. Actuators 605 cause motion of some mechanical element of the vehicle in response to a control signal. For example, actuators 605 may be hydraulic actuators, pneumatic actuators or electrical/electronic actuators such as a stepper motor. Actuators 605 may be used to move vehicle lighting devices to implement intelligent light, for example.

Actuators 605 may also be "dumb" devices that react to a simple analog voltage input, or "smart" devices with built-in memory and processing capability. Actuators 605 may be activated based on a sensed parameter from sensors 603, and one such sensed parameter may be a physical position of the actuator 603 itself. Thus, the sensors 603 and actuators 605 may be connected in a feedback control loop for diagnostic detection and control of the vehicle 601.

Control units 607 include any embedded system, processor, electronic control unit (ECU) or microcontroller. Control unit 607 may be dedicated to a specific region or function of the vehicle 601. For example, control unit 607 can provide memory and control logic functions for several dumb devices, such as passive sensors 603 and actuators 605. In one embodiment, control unit 607 is an ECU dedicated for controlling one or more lighting devices according to embodiments disclosed herein. Typically, numerous ECUs, with different embedded software, may be found in a single automobile and may communicate via internal networks as discussed below.

On-board computer 620 is a vehicle device for providing general purpose computing functionality within the vehicle 601. The on-board computer 620 typically handles computationally intensive functions based on software applications or "apps" loaded into memory. On-board computer 620 may also provide a common interface for different communication networks in the vehicle environment 600. On-board computer 620 includes one or more processor 621, one or more memory 623, one or more user interface 625, and one or more network interface 627. One or more display 609 and one or more router 611 may be an integral part of the on board computer 610, or distributed in the vehicle and associated with the on-board computer and other vehicle devices. Separate displays 609 may be provided in suitable locations for access by a driver and passengers in the vehicle 601.

On-board computer 620, and other associated or integrated components such as vehicle devices can include one or more memory element 623 for storing information to be used in achieving operations associated with control of light panels as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 600 could be provided in any database, register, table, cache, queue, control list, or storage structure, based on particular needs and implementations, all of which could be referenced in any suitable timeframe.

In example embodiments, the operations for controlling light panel devices may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 623) can store data used for the operations described herein. This includes the memory elements being able to store software, logic, code, or processor instructions that are executed to carry out the activities described in this Specification.

Processor 621 can execute software or algorithms to perform activities to enable control of lighting devices disclosed herein. A processor 621 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 6 may be communicatively coupled to one another by one or more suitable communications medium (wired, wireless, optical) that provides a pathway for electronic communications. Any element in FIG. 6 may act as a network node in communication with any other element of FIG. 6 also acting as a network node. Any suitable network messaging protocol, network topology or network geographic scope may be included in the vehicle environment 600. Thus, embodiments of on-board computer 10 may include one or more distinct interfaces, represented by network interfaces 627, to facilitate communication via the various networks (including both internal and external networks) described herein. Such network interfaces 627 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes of vehicle environment 600 can also include suitable interfaces for receiving, transmitting, and/or otherwise communicating data or information in the vehicle environment 600.

Multiple internal vehicle networks represented by 640 may exist in the vehicle 601 to provide communication pathways to various vehicle devices distributed throughout the vehicle 601. An internal vehicle network 640 is a collection of nodes, such as vehicle devices, integrated with or otherwise linked to the vehicle and interconnected by communication means. Vehicle networks 640 typically include hard wired bus type networks, each providing communication pathways to particular vehicle devices distributed throughout a vehicle. FIG. 6 shows four examples of such hard wired networks: Controller Area Network (CAN)

641, Local Internet Network (LIN) 643, Flexray bus 645, and Media Oriented System Transport (MOST) network 647.

CAN bus 641 uses a message based protocol, designed for and typically used by automotive applications. The CAN bus 641 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 641 may connect a transmission sensor and an energy sensor to a main engine controller, and a different CAN bus may connect the main engine controller and a main body controller to on-board computer 620. LIN network 643, may be used to sense external conditions such as light, or to control small mechanisms such as door locking systems. For example, LIN bus 643 may connect a driver's seat actuator, temperature controls, and windshield wiper actuators to a main body controller of a CAN bus.

Flexray bus 645 is typically a dedicated network for hard real-time controllers, used for drive-by-wire and/or brake-by-wire applications in which information from the engine and/or wheels of the vehicle 601 is collected and transmitted to appropriate applications and/or data repositories. For example, Flexray bus 645 may connect a chassis module of the vehicle 601 to on-board computer 620 through an appropriate interface, and/or may connect brakes and electronic stability control (ESB) to the chassis module attached to Flexray 645. MOST network 647 can also be found in vehicles for transmitting audio, video, and voice on fiber optics. MOST buses 647 can connect media system 608, to on-board computer 620 through appropriate interfaces, and/or connect a reversing camera and a navigation system to an intermediate device which is connected to computer by MOST bus 647.

Other hard wired internal networks such as Ethernet may be used to interconnect vehicle devices in the vehicle. Further, internal wireless networks 649, such as near field communications, Bluetooth etc. may interconnect vehicle devices.

External networks and devices 650 may be accessed from vehicle 601 by vehicle devices and in-vehicle mobile devices 630 when a communication link is available. In-vehicle mobile devices 630 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 600. Data, may be any type of numeric, voice, video, or script data, or any type of source or object code, or any other suitable information in any appropriate format that may be communicated from one point to another in electronic devices and/or networks. A vehicle router 611 may also be used to access external network infrastructure within range of the antenna 613 of vehicle 601.

Some form of wireless communication is needed to achieve external network connectivity from vehicle 601. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 600 via some network, and such communication may be initiated through any suitable device such as, in-vehicle mobile device 630, display 609, user interface 625, or external devices 650.

In-vehicle mobile devices 630, and mobile devices external to vehicle 601, may communicate with on-board computer 620 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 620 through a USB cable or wireless network when, for example, the external mobile device is a diagnostic tool used by a mechanic for servicing vehicle 10.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims. In particular, one skilled in the art will understand that the invention disclosed herein can be applied to meet could be applied in accordance with Federal Motor Vehicle Safety Standards (FMVSS) No. 108, as well as corresponding regulations in Europe, Japan, China and other parts of the world.

The invention claimed is:

1. A light device for a vehicle, comprising:
   an enclosure comprising a transmissive portion configured to transmit light generated within the enclosure;
   a matrix material contained within said enclosure and comprising quantum dots dispersed throughout the matrix material, wherein said matrix material is a cured liquid with said quantum dots suspended therein;
   an energy source configured to couple energy to said quantum dots such that the quantum dots emit light that is transmitted through said transmissive portion of the enclosure,
   wherein said energy source comprises a light source optically coupled to the matrix material and
   wherein said light source comprises a first light source and a second light source each optically coupled to the matrix material, which are configured to provide pumping light at a wavelength spectrum that includes an absorption wavelength that can be absorbed by said quantum dots; and
   a controller configured to control the first and the second light sources to achieve different light output characteristics from a panel, wherein said controller is configured to control the first and the second light sources to achieve at least one of spatial effects and dynamic effects of a light output in an illumination region.

2. The light device of claim 1, wherein said enclosure further comprising at least one of a reflective portion and an opaque portion which is positioned opposite to said transmissive portion with said fluid material contained therebetween.

3. The light device of claim 1, wherein said enclosure is a rigid structure.

4. The light device of claim 1, wherein said enclosure is a pliable structure.

5. The light device of claim 1, wherein said matrix material is a liquid with said quantum dots dispersed in said liquid.

6. The device of claim 1, wherein said quantum dots comprise multiple quantum dots having different sizes such that the quantum dots emit light having different wavelengths.

7. The device of claim 6, wherein said quantum dots are homogeneously dispersed in said matrix such that the multiple wavelengths combine to form white light.

8. The lighting device of claim 1, wherein the first and second light sources are configured to generate first and second light of a same type.

9. The lighting device of claim 2, wherein the first and the second light sources are configured to generate a first and a second light of different types.

10. The lighting device of claim 1, wherein said energy source is an electrical energy source electrically coupled to said matrix material containing the quantum dots.

11. The lighting device of claim 1, further comprising: a first electrode provided at a first position inside said container, and a second electrode provided at a second position opposite to said first position such that a voltage potential provided between the first and second electrodes couples current energy to said quantum dots to emit light.

12. A light device of a vehicle, comprising:
an enclosure including a number of light-transmissive portions that are configured to transmit generated light;
a matrix material contained with the enclosure that includes a number of quantum dots dispersed throughout the matrix material, wherein the matrix material represents a cured liquid with said quantum dots distributed in-suspension of the matrix material;
an energy source configured to couple an amount of energy to said quantum dots such that the quantum dots emit a distributed light, which is transmitted through the light-transmissive portions of the enclosure, wherein the energy source includes a light source that is optically coupled to the matrix material and wherein said light source comprises a first light source and a second light source that is each optically coupled to said matrix material and are configured pump light at a wavelength spectrum that includes an absorption wavelength, which can be absorbed by the quantum dots; and
a controller that is configured to control the first and the second light sources to achieve a number of light output characteristics that are different, where the controller is also configured to control the first and the second light sources to achieve at least one of a spatial effect or dynamic effect of a light output in an illumination region.

* * * * *

UNITED STATES PATENT AND TRADEMARK OFFICE
CERTIFICATE OF CORRECTION

PATENT NO. : 10,989,387 B2  
APPLICATION NO. : 15/929075  
DATED : April 27, 2021  
INVENTOR(S) : Valere Calais Page 1 of 1

It is certified that error appears in the above-identified patent and that said Letters Patent is hereby corrected as shown below:

In the Claims

Column 13 Line 11 In Claim 6, replace, "The device of claim 1, wherein . . ." with --The light device of claim 1, wherein . . .--

Column 13 Line 15 In Claim 7, replace, "The device of claim 6, wherein . . ." with --The light device of claim 6, wherein . . .--

Column 13 Line 18 In Claim 8, replace, "The lighting device of claim 1, wherein . . ." with --The light device of claim 1, wherein . . .--

Column 13 Line 21 In Claim 9, replace, "The lighting device of claim 2, wherein . . ." with --The light device of claim 2, wherein . . .--

Column 13 Line 24 In Claim 10, replace, "The lighting device of claim 1, wherein . . ." with --The light device of claim 1, wherein . . .--

Column 13 Line 27 In Claim 11, replace, "The lighting device of claim 1, further . . ." with --The light device of claim 1, further . . .--

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*